United States Patent Office 2,714,624
Patented Aug. 2, 1955

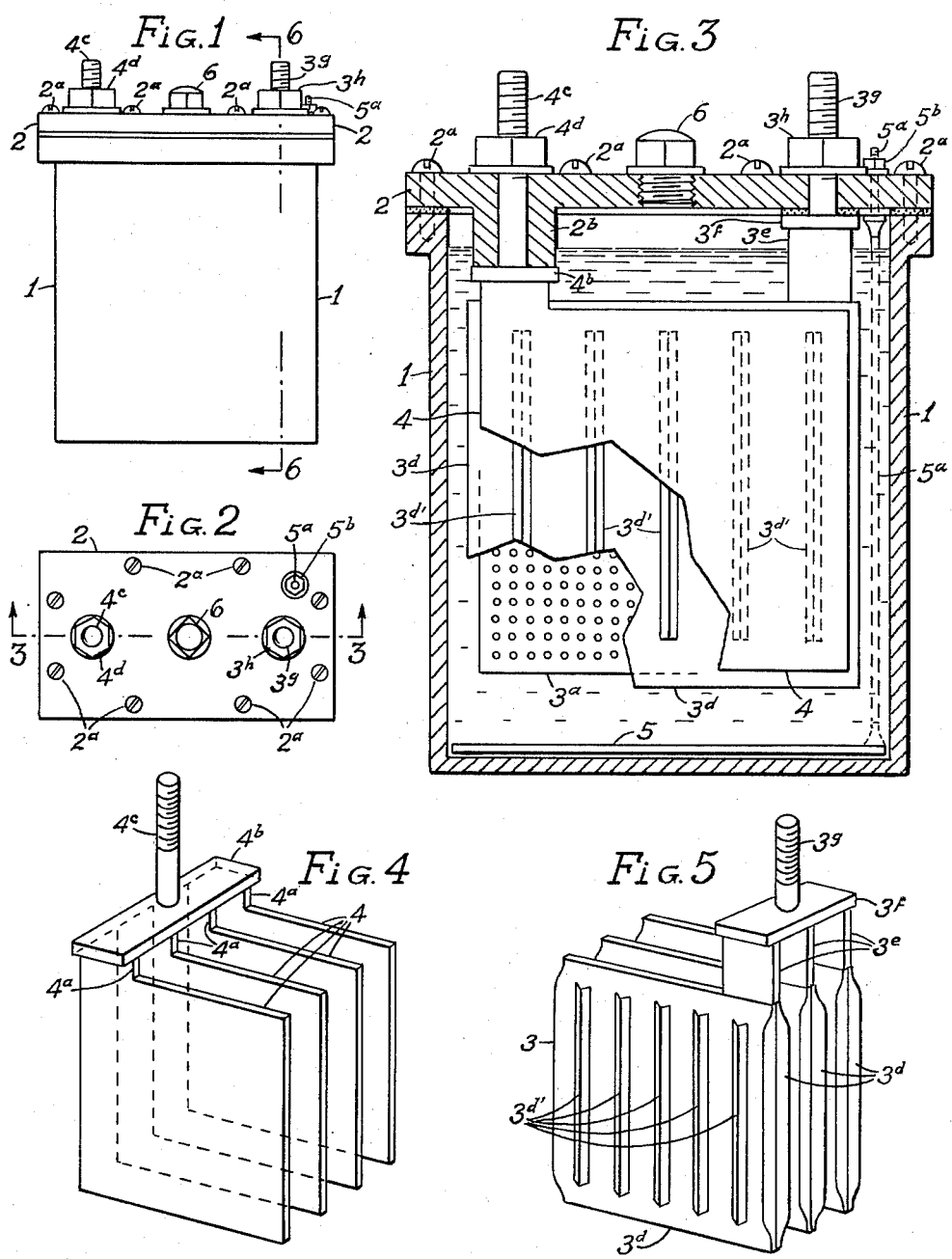

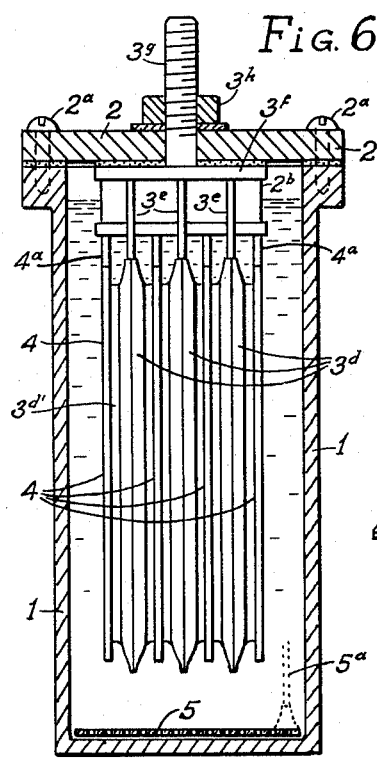
Fig. 6
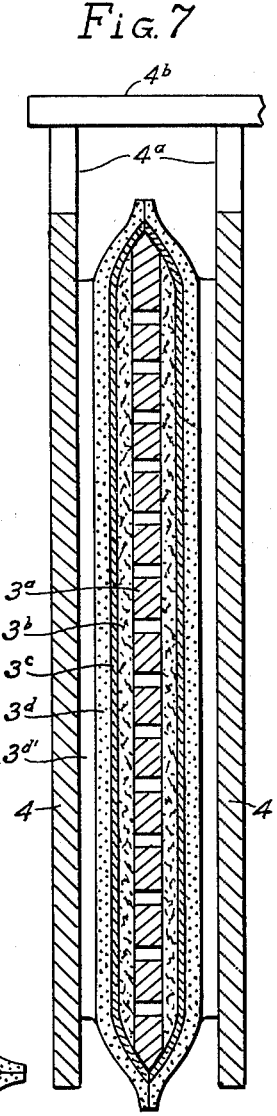
Fig. 7
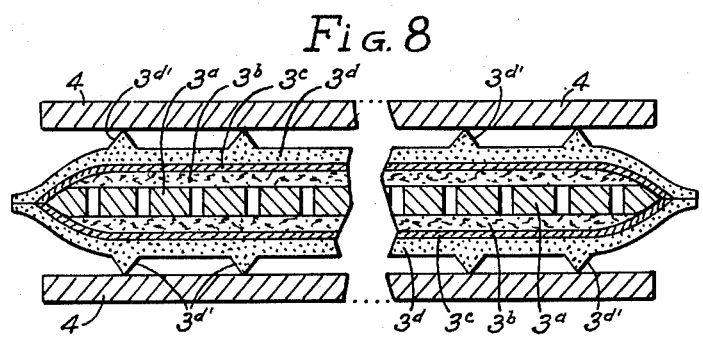
Fig. 8
Fig. 9

2,714,624

STORAGE BATTERIES

Arquimedes Sayas Costa and Aristides Milian Gonzalez, Guanajay, Cuba

Application March 10, 1954, Serial No. 415,208

3 Claims. (Cl. 136—28)

The present invention relates to storage batteries of the type which employs an alkaline electrolyte instead of an acid one.

As will be seen from the following description, the storage battery invented by us differs from all known storage batteries because in the electrolyte and in both the positive and negative plates are employed combinations of ingredients which heretofore have not been used, and the joint employment in said storage battery of the three aforementioned combinations of ingredients plus the use of an "electrolyte stabilizing device," described later on, are the means employed by us in the obtention of the objects enumerated below.

As in the storage batteries in current use, our improved storage battery comprises, as essential elements of the same, a receptacle, open at the top and furnished with a removable cover, said receptacle containing the electrolyte and groups of positive and negative plates connected in the usual manner; said removable cover presenting openings for the passage of the rods extending upwards from said plate groups, for the upward extension of the aforementioned "electrolyte stabilizing device" and for the pouring of liquid into said receptacle, said last mentioned opening being furnished with a removable cover or plug having a suitable valve to prevent the entrance of dirt and foreign matter into the receptacle while allowing the gases generated in said receptacle to escape into the atmosphere.

An object of our invention is to furnish a storage battery which can be subjected to an excessive charging rate without suffering any deleterious effects. We have often charged it at the rate of 5 amperes per square decimeter, and which, likewise, can be discharged at an excessive rate, for instance at 40 amperes per square decimeter, without deleterious effects.

Another object is to provide a storage battery capable of resisting the effects of its total discharge by being placed in short circuit.

Still another object of the present invention is to provide a storage battery which can be left in open circuit during a prolonged period of time with a minimum loss.

A further object of the present invention is to provide a storage battery in which, due to the action of a special "electrolyte stabilizing device," the accumulation of sediment at the bottom of the receptacle is practically eliminated, thereby preventing the short circuits and other evils produced by such accumulations.

Other objects and advantages of the present invention will become apparent to those skilled in the art through the following description, made in connection with the drawings which illustrate the preferred incorporation of the invention.

In the drawings:

Figure 1 is a front view of a storage battery in which the present invention is incorporated.

Figure 2 is a top view of the storage battery of Figure 1.

Figure 3 is a vertical sectional view (on a larger scale) of the same storage battery with some of the parts of the positive plates broken away in order to better illustrate the construction of said plates.

Figure 4 is a perspective view of the complete group of negative plates.

Figure 5 is a similar view of the complete group of the positive plates.

Figure 6 is a vertical section through line 6—6 of Figure 1, looking in the direction indicated by the arrows.

Figure 7 is a partial section through the extreme end of a combination of two negative and one positive plates in order to clearly illustrate the principal body portion of the positive plate (the portion covered with a paste, paper and rubber) the outer surface of the rubber covering being here illustrated as smooth.

Figure 8 is a somewhat similar figure but in this case the outer rubber covering has the projecting portions $3d'$ of the preferred incorporation.

Figure 9 is a perspective view of the "electrolyte stabilizing device" showing the perforated plate 5, rod $5a$ and lower nut $5b$, the upper nut $5b$ not being shown.

As already indicated, one of the essential features of our improved storage battery is the composition of the electrolyte employed in the same. Said electrolyte consisting of an aqueous solution of potassium hydroxide, potassium zincate, potassium aluminate and distilled water in the following proportions:

|  | Percent |
| --- | --- |
| Potassium hydroxide | from about 10 to about 50 |
| Potassium zincate | from about 10 to about 50 |
| Potassium aluminate | from about 20 to about 60 |

Distilled water in an amount sufficient to produce a solution with specific gravity of from about 1.300 to about 1.800.

We prefer to have the ingredients present in the following proportions:

|  | Percent |
| --- | --- |
| Potassium hydroxide | from 15 to 40 |
| Potassium zincate | from 15 to 40 |
| Potassium aluminate | from 25 to 55 |

Distilled water in an amount sufficient to produce a solution with the desired specific gravity.

Turning now to Figures 7 and 8 of the drawings we see that the positive plates, designated generally by 3, consist of a stainless steel plate $3a$ having a multiplicity of perforations which serve to anchor to it a coating $3b$ of a paste consisting of a mixture of silver oxide, nickel hydroxide, oxide of mercury and finely divided carbon, with sufficient distilled water to give the mixture the necessary consistency; this coating is in turn covered with a sheet $3c$ of porous paper not attacked by the electrolyte; finally the portion of plate $3a$ covered by paste coating $3b$ and paper $3c$ is enclosed in a covering $3d$ made of sheet porous rubber, preferably of the sponge type and having its outer face channelled or ridged (see Figures 3, 5 and 8) although it may have said outer surface substantially smooth, as illustrated in Figures 6 and 7.

The channelled or ridged form being preferred because it eliminates the necessity of using separators between the positive and negative plates of the battery. It is obvious that said ridges or channels may have any suitable form and can be placed in any position, that is, inclined vertical or horizontal, although the vertical from is certainly preferred because it allows the sediment loosened from the negative plates to fall freely on plate 5 the action of which will be explained later.

The paste from which covering $3b$ is made, and which constitutes another of the essential features of the invention, consists of an intimate mixture of silver oxide, nickel hydroxide, oxide of mercury and pulverized carbon in the following proportions:

|                      | Per cent          |
|----------------------|-------------------|
| Oxide of silver      | from about 50 to 90 |
| Hydroxide of nickel  | from about 2 to 45 |
| Oxide of mercury     | from about 1 to 22 |
| Pulverized carbon    | from about 10 to 20 |

Distilled water, sufficient to give the required consistency.

We prefer the following proportions:

|                      | Per cent          |
|----------------------|-------------------|
| Oxide of silver      | from about 60 to 75 |
| Hydroxide of nickel  | from about 4 to 30 |
| Oxide of mercury     | from about 3 to 15 |
| Pulverized carbon    | from about 12 to 18 |

Distilled water to impart the necessary consistency.

The negative plates 4 consist of flat smooth plates made from a bismuth and zinc alloy having the following approximate proportions:

|          | Per cent       |
|----------|----------------|
| Bismuth  | from 70 to 95  |
| Zinc     | from 5 to 30   | although we prefer the following proportions:

|          | Per cent       |
|----------|----------------|
| Bismuth  | from 75 to 85  |
| Zinc     | from 15 to 25  |

As is clearly illustrated in Figures 3, 4, 5 and 6, both positive and negative plates in our improved storage battery have the same general outline as those commonly used at present in the majority of known storage batteris. Each plate, whether positive or negative, has a projecting ear (3e in positive plates and 4a in negative plates) in one of its upper corners and the ears of the corresponding positive and negative plates are firmly connected together by horizontal members 3f for the positive plates (see Figure 5) and 4b for the negative plates (see Figure 4), member 3f being constructed of stainless steel and member 4b of the same bismuth and zinc alloy of which the negative plates are formed. From the upper surfaces of members 3f and 4b, respectively, rods 3g and 4c extend vertically upwards and passing through the corresponding openings in cover 2 have their threaded ends fitted with nuts 3h and 4d respectively, thus providing suitable binding posts for the leads of the electrical circuit to which the storage battery is to be connected.

A horizontal extending perforated stainless steel plate 5 rests on the bottom of receptacle 1, duly spaced from the lower edges of both the positive and negative plates of the battery and has a straight stainless steel rod 5a projecting upwards from one of its corners, said stainless steel rod 5a extending upwards throughout the entire height of receptacle 1 then passes through cover 2, to which it is attached by nuts 5b, as shown in Figures 3, 6 and 9 of the drawings. Numerous experiments and trials have demonstrated that the presence of the above combination formed by plate 5 and rod 5a produces the unexpected result of dissolving all the sediment or particles which fall on said plate from the negative plates of the battery. Why this dissolving action takes place is not known but, as previously stated, numerous trials and experiments performed by the applicants have amply proved that said action does take place. Furthermore, our experiments have shown that when stainless steel plate 5 is used alone in the same position, the dissolving action takes place but at a much slower rate than when the plate and rod combination is used.

It seems that, in this case, the stainless steel acts catalytically to facilitate the more rapid dissolution of the particles of sediment, and that this action is greatly increased by the presence of rod 5a, because when plate 5 is used alone the dissolving action is much slower.

By 2a designated (in Figure 3) a projection on the lower face of cover 2 located at a point immediately above member 4b (which unites the negative plates 4), the purpose of said projection 2a is to contact member 4b so as to maintain said member and all the negative plates 4 completely submerged in the electrolyte in order to prevent the air and gases existing in the upper portion of receptacle 1 from contacting any part of said member and plates. As illustrated, said projection 2a has a vertical perforation to permit the passage of rod 4c.

Since the improved storage battery works in the same manner as those in current use, we deem it unnecessary to describe said working.

What we claim as our invention is:

1. In storage batteries of the alkaline electrolyte type comprising a suitable receptacle closed at the top by a removable cover and in which are suspended a group of electrically interconnected positive plates, a group of negative plates electrically interconnected with each other but spaced from the group of positive plates, said cover having openings through which project outward rods coming independently from said group of positive plates and from said group of negative plates, and an opening for pouring liquid into said receptacle, said last named opening having a cover with a valve which prevents the entrance of foreign matter into said receptacle while allowing gases to escape from the receptacle, the improvements which comprise the use, in combination, of an alkaline electrolyte consisting of an aqueous solution of about 10 to 50% potassium hydroxide, about 10 to 50% potassium zincate, about 20 to 60% potassium aluminate and distilled water; positive plates each of which consists of a stainless steel plate with multiple perforations, said plate being coated with a paste consisting of oxide of silver, oxide of mercury, hydroxide of nickel and pulverized carbon, said coating of paste being in turn covered with porous paper that is not attacked by the electrolyte and said paper covering being in turn covered with laminated porous rubber, preferably with ridges on its outer surface; negative plates consisting of plates made from an alloy of bismuth and zinc; and a flat horizontal plate resting on the bottom of said receptacle and duly spaced from said negative and positive plates, said flat horizontal plate being made from stainless steel, having multiple perforations and being furnished with an upstanding rod of the same metal which extends upwards through the entire height of the receptacle, pierces the cover of the same and is attached to said cover.

2. Improvements in storage batteries as in claim 1, in which said electrolyte is an aqueous solution consisting of approximately

|                      | Per cent       |
|----------------------|----------------|
| Potassium hydroxide  | from 10 to 50  |
| Potassium zincate    | from 10 to 50  |
| Potassium aluminate  | from 20 to 60  |

Distilled water, an amount sufficient to produce a solution having a specific gravity of from 1.400 to 1.600 at 21° C.

said paste with which the stainless steel base of the positive plates is covered having the following composition:

|                      | Per cent       |
|----------------------|----------------|
| Oxide of silver      | from 50 to 90  |
| Oxide of mercury     | from 1 to 22   |
| Hydroxide of nickel  | from 2 to 45   |
| Pulverized carbon    | from 10 to 20  | said negative plates being made from an alloy having the following composition:

|          | Per cent       |
|----------|----------------|
| Bismuth  | from 70 to 99  |
| Zinc     | from 1 to 30   |

3. Improvements in storage batteries as in claim 1, in which the removable cover of said receptacle has on its lower face a portion extending downward for a predetermined distance, said portion being located immediately above the horizontal element connecting the plates of the negative group, said downwardly extended portion of the cover being intended to make contact with the upper surface of said horizontal connecting element to maintain the same and the group of negative plates to which it is attached completely submerged in the electrolyte.

No references cited.